3,804,774
INKS WHICH FLUORESCE WHEN EXPOSED TO NEAR OR MIDDLE ULTRAVIOLET RADIATION
James F. Betts, Euclid, Richard A. Fotland, Warrensville Heights, and Victor P. Petro, Brecksville, Ohio, assignors to Horizons Incorporated, a Division of Horizons Research Incorporated
No Drawing. Filed Aug. 3, 1972, Ser. No. 277,704
Int. Cl. C09k 1/00; F21k 2/00
U.S. Cl. 252—301.2 R                                          7 Claims

ABSTRACT OF THE DISCLOSURE

Blue inks which, when dry, fluoresce with very short luminescent lifetimes when exposed to near U.V. or middle U.V. comprise suitable polymers in which certain anthracenes are dissolved or dispersed.

---

This invention relates to inks or pigments which fluoresce when dry, with very short luminescence lifetimes, when exposed to U.V. radiation. The inks of the invention include both solvent type inks in which a pigment is dissolved in a solvent and disperse-type inks in which a pigment is dispersed in a vehicle in which it is insoluble.

Inks whose dyes or pigments have luminescene lifetimes which are short enough can be used to trigger switching devices and hence are useful, for example, in mail sorting. The equipment which is contemplated in the Post Office switches 900 times per second. Hence phosphorescent compounds with lifetimes of greater than $\frac{1}{900}$th of a second are theoretically unusable. In practice, emission lifetimes much shorter than this are preferred. Simple fluorescence lifetimes are of the order of $10^{-9}$ to $10^{-12}$ seconds. Phosphorescence lifetimes may be as high as hours or more.

Red inks which fluoresce in the 500 to 700 nm. region are available for mail sorting, but are less acceptable than blue or green inks to which most persons are accustomed. Blue or green inks which fluoresce sufficiently in the 500 to 700 nm. region are desirable for aesthetic as well as practical reasons, color coding or a second switching operation for example.

This invention relates to blue and green inks which fluoresce upon excitation with near (365 nm.) U.V. or middle (254 nm.) U.V. radiation, and which emit their light, with very short luminescence lifetimes, in the 500 to 700 nm. region. These inks are totally organic in nature, also an advantage, in that they do not have the abrasive wearing quality of many inks based on abrasive, inorganic pigments.

The inks of this invention are prepared by dissolving a quantity of dye-former in a lower alkyl carboxylic acid, preferably glacial acetic acid. A quantity sufficient to give an intense enough blue or green, but less than the solubility of the dye-former in glacial acetic acid, is used. For example, 0.263 g. of dye-former per cc. of glacial acetic acid has been found to be a convenient amount, fulfilling the above requirements for many dye precursors. More or less acid may be added where convenient. A quantity of a polymer solution is now added in a solvent system chosen for compatibility with all components and proper drying rate.

Suitable dye-formers are compounds represented by the formula:

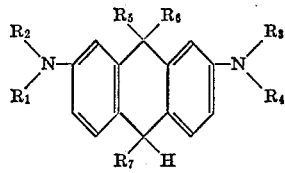

in which each $R_1$, $R_2$, $R_3$, and $R_4$ are preferably $CH_3$ or $C_2H_5$, but may be H, other lower alkyl, substituted lower alkyl, phenyl, or substituted phenyl, suitable substituents include OH and halogen; and $R_1$, $R_2$, $R_3$ and $R_4$ are not necessarily all alike;
$R_5$ and $R_6$ are each preferably H or $CH_3$ but may be any of the groups defining $R_1$; and
$R_7$ is preferably H, $CH_3$, phenyl or para-dimethylaminophenyl, but can be any of the substituents defined $R_1$.

The following are particularly preferred dye precursors:

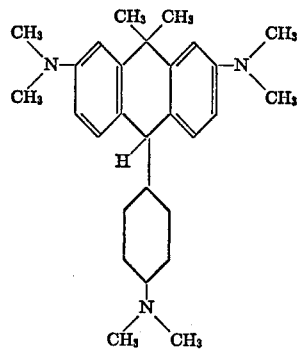

2,7 - bis(dimethylamino) - 10 - p-dimethylaminophenyl-9,10-dihydro-9, 9-dimethylanthracene;

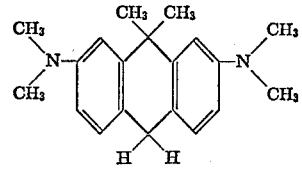

2,7 - bis(dimethylamino) - 9,10 - dihydro - 9,9-dimethylanthracene; and

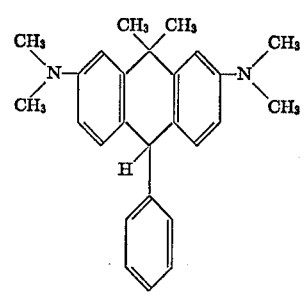

2,7 - bis(dimethylamino) - 10 - phenyl-9,10-dihydro-9,9-dimethylanthracene.

Suitable polymers are preferably those which are derived from acrylic and substituted acrylic acids. Other polymers which may be used are polyvinylsulfonic acids, polyvinylphosphoric acids, sulfonated polystyrene or other similar polymers possessing residual acidic linkage or hydrogen bonding sites.

While we do not wish to be bound by any theory of function of this invention, it has been found that the polymers with which the red fluorescence is obtained in the dried ink appear to have the following characteristics:

(1) At least residual carboxylic acid functionality or hydrogen bonding functionality to hold the acetate salt of the dye precursor in a rigid formation in the dried ink. This presumably forces the molecule to lose its excitation energy as radiation in the 500 to 700 nm. range instead of losing it by dissipation as thermal energy in the solid state matrix of the dried ink; and (2) A polymeric structure below the glass transition temperature of the polymer, so that in the dried ink the glass structure of the polymer contributes to the rigidity of the dye salt molecule, for the same reasons as mentioned in (1).

Using the polymer matrices found suitable in this invention, the dry inks are quite stable to heat (4 min. at 160° C., no effect on luminescence) and U.V. stable (4 hrs. at 12 inches from a G.E. Sunlamp, not affected).

The following examples further illustrate the invention and are not intended to limit the same.

EXAMPLE 1

0.263 g. of 2,7 - bis(dimethylamino) - 10-p-dimethylaminophenyl-9,10-dihydro - 9,9 - dimethylanthracene is mixed with 2 cc. of glacial acetic acid. A blue solution with an intense red fluorescence is formed. Evaporation upon Whatman No. 1 filter paper produces a dark blue dye which no longer fluoresces.

EXAMPLE 2

0.263 g. of 2,7-bis(dimethylamino) - 10 - p - dimethylaminophenyl-9,10-dihydro - 9,9 - dimethylanthracene is mixed with 1 cc. of glacial acetic acid. 2 cc. of acryloid AT75, a carboxy function containing mixed acrylic, methacrylic ester polymer solution from Rohm and Haas was added. This solution is streaked or written on Whatman No. 1 filter paper. An intense blue dye image results. When this image is excited with 254 nm. or 365 nm. radiation, an intense red fluorescence results. The excitation peak of this ink image is in the 300 to 330 nm. region. The emission peak is in the 590–660 nm. region.

EXAMPLE 3

0.263 g. of 2,7-bis(dimethylamino) - 10 - p - dimethylaminophenyl-9,10 - dihydro - 9,9 - dimethylanthracene is mixed with 1 cc. of glacial acetic acid. 2 cc. of Acrysol A–1, a solution of polyacrylic acid from Rohm and Haas was added. This solution was treated as in Example 2. with similar results.

EXAMPLE 4

0.263 g. of 2,7-bis(dimethylamino) - 10 - p - dimethylaminophenyl-9,10 - dihydro - 9,9 - dimethylanthracene is mixed with 1 cc. of glacial acetic acid. 2 cc. of Acryloid AT56, a hydroxy function containing mixed acrylic, methacrylic ester polymer from Rohm and Haas was added. This solution was treated as in Example 2 with similar results.

EXAMPLE 5

0.263 g. of 2,7-bis(dimethylamino) - 10 - p - dimethylaminophenyl-9,10 - dihydro - 9,9 - dimethylanthracene was mixed with 1 cc. of glacial acetic acid. 2 cc. of 10% solution of Hercules Cellulose Gum (GMC 722) in $H_2O$ was added. This solution was treated as in Example 2.e No fluorescence resulted.

EXAMPLE 6

0.263 g. of 2,7-bis(dimethylamino) - 10 - p - dimethylaminophenyl-9,10 - dihydro - 9,9 - dimethylanthracene was mixed with 1 cc. of glacial acetic acid. 2 cc. of 10% Gelvatol polyvinyl alcohol in $H_2O$ was added. The solution was treated as in Example 2. No fluorescence resulted.

EXAMPLE 7

0.263 g. of 2,7-bis-dimethylamino) - 9,10 - dihydro-9,9-dimethyl-anthracene was mixed with 1 cc. of glacial acetic acid. This solution was mixed with 2 cc. of Acryloid AT71, a carboxy function containing mixed acrylic, methacrylic ester polymer solution from Rohm and Haas. The solution was treated as in Example 2 with similar results.

EXAMPLE 8

0.263 g. of 2,7-bis(dimethylamino) - 9,10 - dihydro-9,9-dimethyl-anthracene was mixed with 1 cc. of glacial acetic acid. This solution was mixed with 2 cc. of Acrysol A–5, a polyacrylic acid solution from Rohm and Haas. This solution was treated as in Example 2 with similar intense red fluorescence.

EXAMPLES 9–11

0.263 g. of 2,7-bis(dimethylamino) - 9,10 - dihydro-9,9-dimethyl-anthracene was mixed with 1 cc. of glacial acetic acid, mixed with 2 cc. of polymer solutions described above of Hercules Cellulose Gum (GMC 722) Gelvatol 20/60 (10% in $H_2O$) or Acryloid A–10 (polymethyl methacrylate) as described in Example 2. No fluorescence resulted.

EXAMPLE 12

0.263 g. of 2,7-bis(dimethylamino) - 9,10 - dihydro-9,9-methyl-anthracene, mixed with 1 cc. of glacial acetic acid was treated as in Example 1. No fluorescence resulted.

EXAMPLE 13

0.263 g. of 2,7-bis(dimethylamino) - 10 - p - dimethylaminophenyl - 9,10 - dihydro - 9,9 - dimethylanthracene, mixed with 1 cc. of glacial acetic acid, was added to 2 cc. of Acrysol AC–5, a solution of polyacrylic acid from Rohm and Haas. This material was evaporated to dryness, resulting in a blue solid which fluoresced strongly in the 580 to 660 mm. region when excited by U.V. radiation, which, when ground suitably for dispersing in an ink, is a non-abrasive red fluorescing totally organic blue ink pigment.

EXAMPLE 14

0.263 g. of 2,7-bis(dimethylamino)-10-phenyl-9,10-dihydro-9,9-dimethylanthracene is dissolved in 1 cc. of glacial acetic acid. 2 cc. of Acryloid AT75 is added and the solution is treated as in Example 2. A bright green ink results which fluoresces strongly in the 550 to 680 nm. region when excited by 254 nm. or 365 nm. U.V. radiation.

EXAMPLE 15

0.263 g. of 2,7-bis(dimethylamino)-10-phenyl-9,10-dihydro-9,9-dimethylanthracene is dissolved in 1 cc. of glacial acetic acid. 2 cc. of Acrysol A–5 is added. The solution is treated as in Example 2, producing a green ink which fluoresces strongly in the red when exposed to U.V. radiation at 254 nm. or 365 nm.

EXAMPLE 16

0.263 g. of 2,7-bis(dimethylamino)-10-phenyl-9,10-dihydro-9,9-dimethylanthracene is treated the same as in Example 13, resulting in a dry soft nonabrasive green pigment which fluoresces strongly in the red when exposed to 254 nm. or 365 nm. radiation and is suitable for dispersion as a totally organic pigment in an ink.

Acrysol and Acryloid, respectively described in literature published by Rohm and Haas as acid containing cross linked acrylic copolymers and as polymers of esters of acrylic and methacrylic acid. (See description in U.S. 3,294,726, for example.)

The materials utilized in the preceding examples may be defined as follows:

| Polymer: | Composition |
| --- | --- |
| Acryloid AT75 | Carboxy function containing mixed acrylic, methacrylic ester polymers. |
| Acryloid AT71 | Carboxy function containing mixed acrylic, methacrylic ester polymers. |
| Acrysol A–1 | Polyacrylic acid. |
| Acrysol A–5 | Polyacrylic acid. |
| Acryloid AT56 | Hydroxyl function containing mixed acrylic, methacrylic ester polymer. |
| Acryloid A–10 | Polymethylmethacrylate. |
| Hercules Cellulose Gum (C M C 722) | Carboxymethyl cellulose. |
| Gelvatol 20/60 | Polyvinyl alcohol. |

The quantity of polymer in the composition may vary from approximately 1% to 50% by weight, depending on the polymer chosen. The upper limit is determined by the solubility of the particular polymer in the ink system. The minimum is chosen by determining the amount which produces maximum luminescence for the specific dye-former-acid-polymer combination.

The quantity of acid is preferably from 0.10 to 2.0 cc. of acid per gram of dye-former. The quantity varies with the dye-former chosen but is preferably greater than 1 mole of acid per mole of dye-former. The amount of acid chosen should be the minimum amount which gives maximum fluorescence for the specific dye-former-polymer-acid combination.

The quantity of dye-former present is any amount up to the limit of solubility of the chosen dye-former in the dye-former-polymer-acid system. The lower limit of dye-former is that amount which gives satisfactory luminescence in the chosen system.

What is claimed is:

1. A blue or green ink composition which fluoresces, when dry, with very short luminescent lifetimes when exposed to U.V. radiation, said composition consisting of:
   (1) at least one substituted anthracene compound represented by the formula

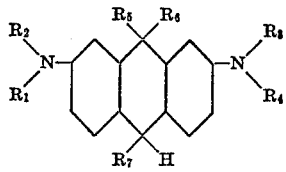

in which each $R_1$, $R_2$, $R_3$, and $R_4$ are preferably $CH_3$ or $C_2H_5$, but may be H, other lower alkyl, substituted lower alkyl, phenyl, or substituted phenyl, suitable substituents include OH and halogen; and $R_1$, $R_2$, $R_3$ and $R_4$ are not necessarily all alike;

$R_5$ and $R_6$ are each preferably H or $CH_3$ but may be any of the groups defining $R_1$; and $R_7$ is preferably H, $CH_3$, phenyl or para-dimethylaminophenyl, but can be any of the substituents defined $R_1$; and (2) a synthetic polymer having residual acid functionality selected from a group consisting of acrylic acid and methacrylic acid polymers, polyvinylsulfonic acids, polyvinylphosphoric acids, sulfonated polystyrene, and mixtures thereof; and
   (3) a lower alkyl carboxylic acid.

2. The composition of claim 1 in the form of a dried pigment.

3. The composition of claim 1 wherein $R_1$, $R_2$, $R_3$, $R_4$, $R_5$ and $R_6$ are each —$CH_3$.

4. A method of sorting documents which comprises applying the ink of claim 1 in a liquid vehicle to at least some of said documents, and after said ink has dried exposing the inked portion of said documents to U.V. radiation for a very short time interval, sufficient to cause said ink to fluoresce; and sorting said documents on the basis of said fluorescence.

5. The composition of claim 1 prepared from a liquid composition consisting of
   (1) said anthracene compound;
   (2) between 1 and 50% by weight of said polymer; and
   (3) between 0.10 and 2.0 cc. of lower alkyl carboxylic acid per gram of anthracene compound; by evaporation of liquid from said liquid composition.

6. The composition of claim 1 in which the polymer is a polyacrylic acid.

7. The polymer of claim 1 in which the polymer is a polyvinylsulfonic or polyvinylphosphoric acid polymer.

References Cited

UNITED STATES PATENTS

| | | | |
|---|---|---|---|
| 3,445,232 | 5/1969 | Shirey | 96—90 R |
| 3,272,635 | 9/1966 | Sprague et al. | 96—90 R |
| 3,683,336 | 8/1972 | Brownlee | 117—33.5 R |
| 3,115,417 | 12/1963 | Christensen | 117—33.5 R |
| 3,767,516 | 10/1973 | Brady | 117—33.5 R |
| 3,660,096 | 5/1972 | Wainer et al. | 96—90 R |
| 3,560,211 | 2/1971 | Fotland | 96—48 R |
| 3,615,565 | 10/1971 | Gerlach et al. | 96—90 R |
| 3,377,167 | 4/1968 | Fichter | 96—90 R |
| 2,950,256 | 8/1960 | Mazer et al. | 106—20 X Y |
| 3,567,647 | 3/1971 | Gerhardt | 106—20 X Y |
| 3,445,232 | 5/1969 | Shirey | 96—90 R |

FOREIGN PATENTS

| | | | |
|---|---|---|---|
| 1,180,883 | 5/1968 | Great Britain | 96—90 R |
| 1,180,859 | 11/1962 | Germany | 117—33.5 |
| 1,180,883 | 2/1970 | Great Britain | 106—21 |

OTHER REFERENCES

Hoffmann, F. W.: "Silver-Free Light-Sensitive Photographic Material" in Chemical Abstracts, vol. 65, p. 3215c and p. 4907b, 1966.

JOSEPH L. SCHOFER, Primary Examiner

T. S. GRON, Assistant Examiner

U.S. Cl. X.R.

96—88, 89, 90 R; 106—22; 117—33.5 R; 252—301.3 R